United States Patent

Isono et al.

[15] 3,702,376

[45] Nov. 7, 1972

[54] COMB FILTER CIRCUIT

[72] Inventors: Katsuo Isono, Tokyo; Hisao Okada, Kanagawa-ken, both of Japan

[73] Assignee: Sony Corporation, Tokyo, Japan

[22] Filed: Dec. 14, 1970

[21] Appl. No.: 97,936

[30] Foreign Application Priority Data

Dec. 16, 1969 Japan ....................44/101205
Jan. 29, 1970 Japan ........................45/9259

[52] U.S. Cl. ................................178/5.4 R, 328/139
[51] Int. Cl. ...............................................H03n 9/38
[58] Field of Search ..........178/5.4 R; 333/29, 30, 73, 333/75; 307/233; 328/139

[56] References Cited

UNITED STATES PATENTS

| | | | |
|---|---|---|---|
| 2,729,698 | 1/1956 | Fredendall | 178/5.4 R |
| 2,855,573 | 10/1958 | Fredendall | 333/73 R |

OTHER PUBLICATIONS

RCA Technical Notes, " Color Separation Circuits for Television," Fredendall, No. 232, Jan. 1959

*Primary Examiner*—Richard Murray
*Assistant Examiner*—John C. Martin
*Attorney*—Lewis H. Eslinger, Alvin Sinderbrand and Curtis, Morris & Safford

[57] ABSTRACT

A comb filter circuit for separating luminance and chrominance signal components from a composite color television signal transmitted with the luminance and chrominance signal components in a frequency interleaved relation, comprises a delay means for delaying the composite color television signal by one horizontal scanning period and a bridge circuit connected to the delay means and consisting of four sections of substantially equal impedance. To the bridge circuit the delayed and non-delayed composite color television signals are suppled and therein the addition and the subtraction of both signals are performed, so that the luminance and chrominance signals are derived separately from the output terminals of the bridge circuit.

8 Claims, 14 Drawing Figures

INVENTOR
KATSUO ISONO
HISAO OKADA
BY [signature]

INVENTOR
KATSUO ISONO
HISAO OKADA
BY

INVENTOR
KATSUO ISONO
BY HISAO OKADA

INVENTOR
KATSUO ISONO
HISAO OKADA
BY

INVENTOR.
KATSUO ISONO
HISAO OKADA
BY

COMB FILTER CIRCUIT

This invention relates generally to a filter circuit for separating a luminance signal component and a chrominance signal component from a composite color television signal, and more particularly to a novel and improved comb filter circuit for simultaneously separating a luminance signal component and a chrominance signal component from a composite color television signal which is transmitted with both signal components in frequency-interleaved relation.

As is well known, a color television signal of the NTSC system is transmitted with a chrominance signal component included in a high-frequency component of a luminance signal in a frequency inter-leaved manner. In the prior art, such a color television signal is separated by a low-pass filter and a band-pass filter into the luminance signal and the chrominance signal, respectively. However, when the chrominance signal picked up by the band-pass filter is added to a color demodulator, the high-frequency component of the luminance signal included in the chrominance signal is converted by the color demodulator into a low-frequency component and appears on the screen in the form of color noise. This disturbance is called a cross-color noise or cross-color disturbance.

One method that has been proposed for the elimination of such disturbance is to obtain the luminance signal and the chrominance signal separately by the employment of a filter circuit which consists of a delay circuit having a delay time of one horizontal scanning period, an adder circuit and a subtracting circuit, and which defines a filter having a comb characteristic permitting the passage of only the luminance signal therethrough, (hereinafter referred to as a Y-type characteristic) and a filter having a comb characteristic permitting the passage of only the chrominance signal therethrough (hereinafter referred to as a C-type characteristic).

More specifically, the delay circuit and the adder circuit for adding the delayed output of the delay circuit with a non-delayed signal constitute the filter of the Y-type characteristic to derive therefrom the luminance signal, while the delay circuit and the subtracting circuit for the subtraction of the output of the delay circuit and the non-delayed signal constitute filter of the C-type characteristic to derive therefrom the chrominance signal. However, the conventional construction of such a system is extremely complex.

In view of the foregoing, an object of this invention is to provide a comb filter circuit of simple construction which is capable of both addition and subtraction of a delayed signal and a non-delayed signal.

A further object of this invention is to provide a comb filter circuit which enables a luminance signal and a chrominance signal to be separated from each other without phase distortion.

The above, and other objects, features and advantages of this invention, will become apparent from the following description of illustrative embodiments which is to be read in conjunction with the accompanying drawings, wherein.

Figure 6:
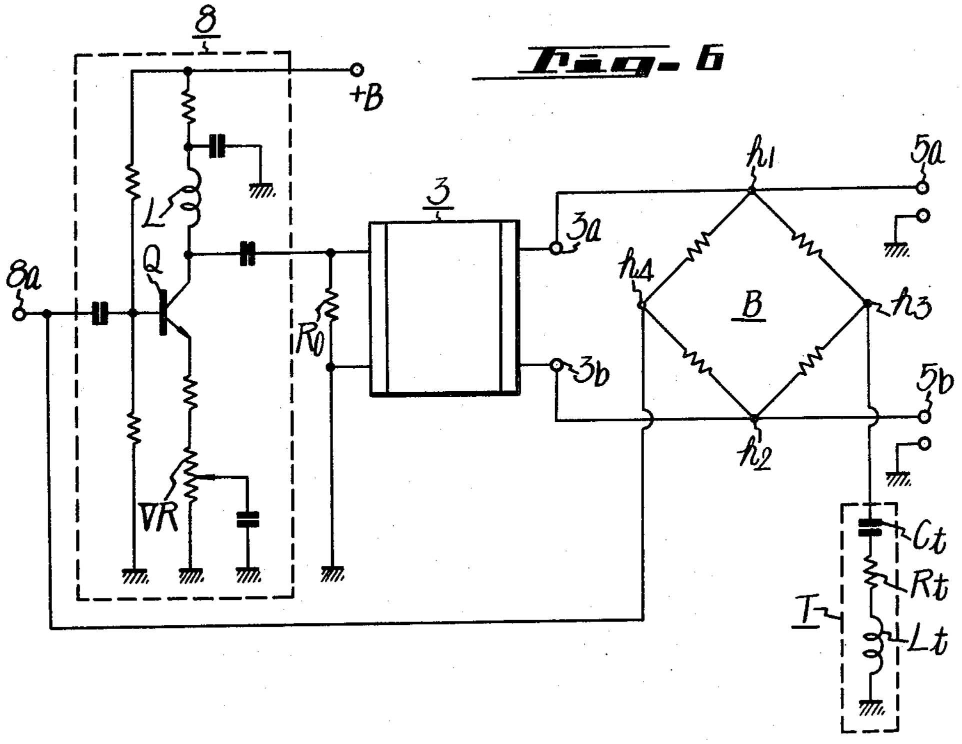
Figure 7:
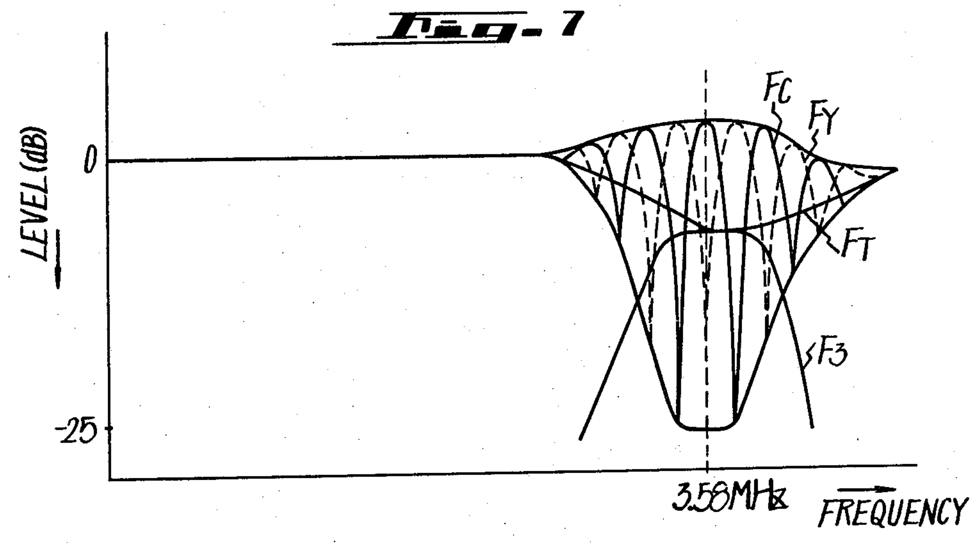
Figures 8, 9:
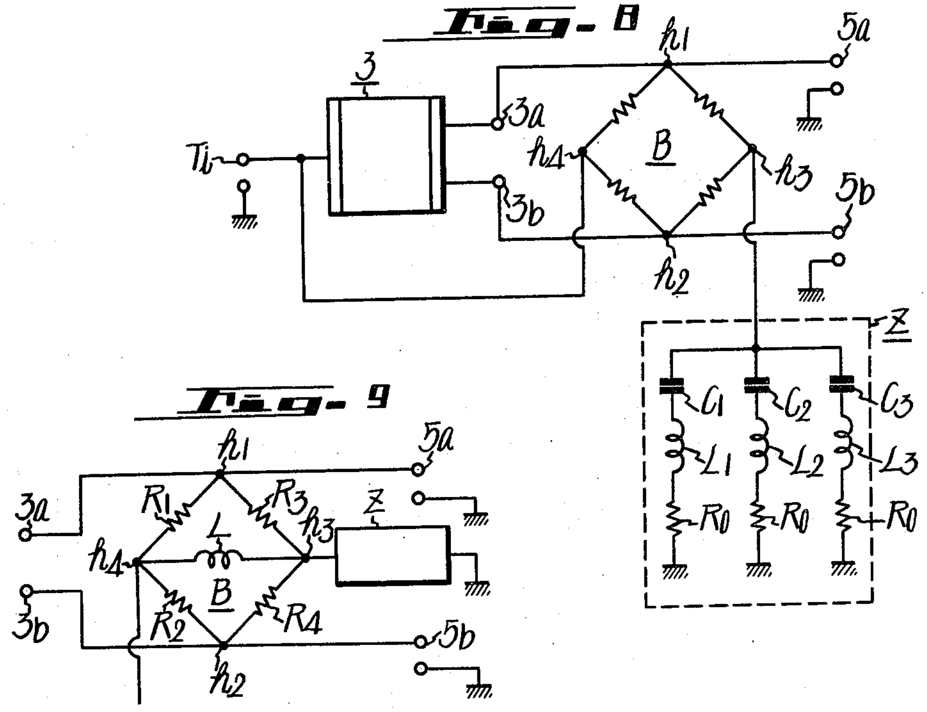
Figure 10:
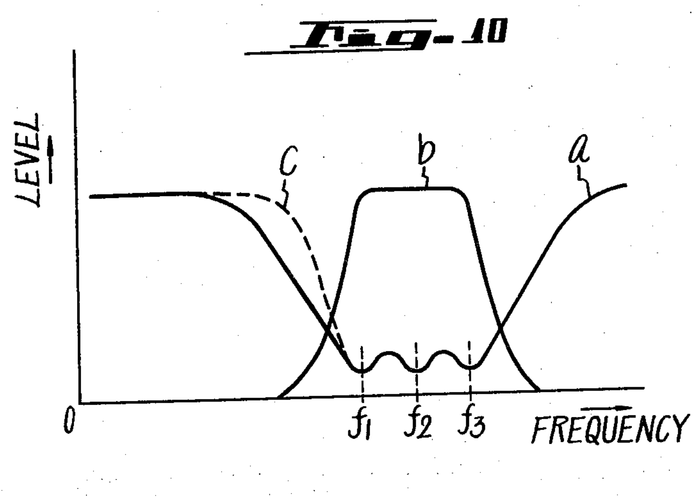
Figure 11:
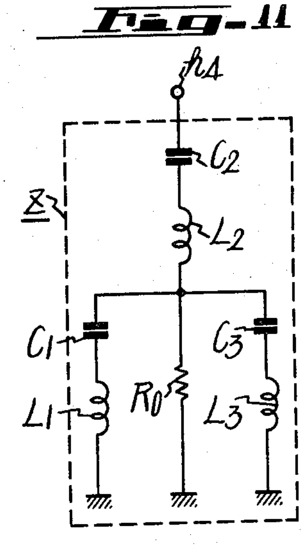
Figure 12:
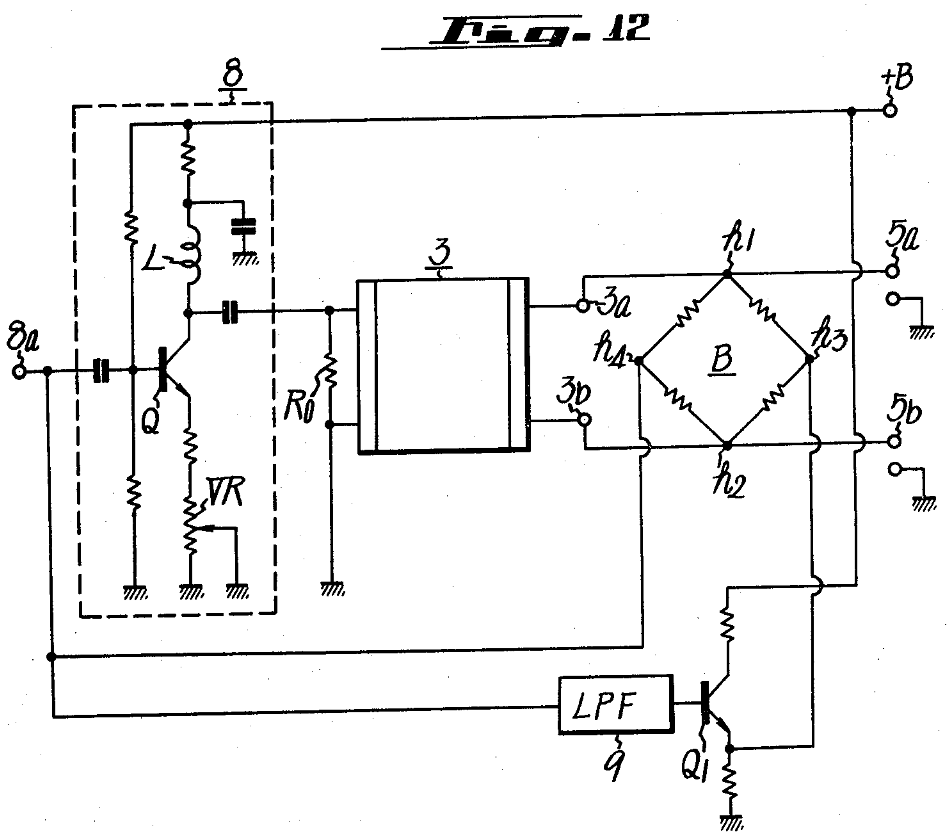
Figure 13:
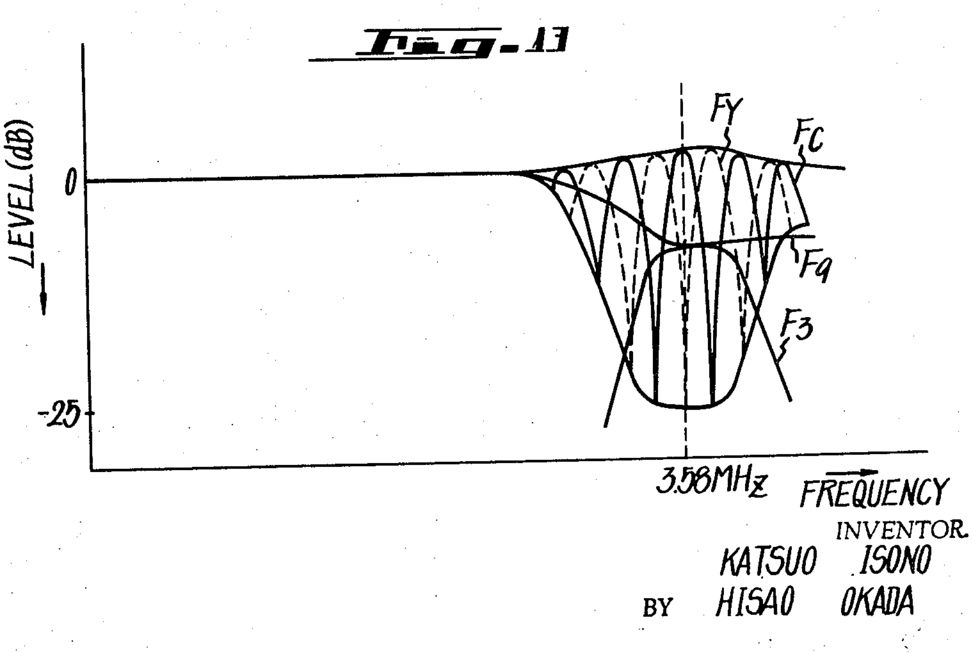

FIGS. 6, 8, 9, 11 and 12 are wiring diagrams showing other embodiments of this invention; and FIGS. 7, 10 and 13 are graphs for explaining the operation of the embodiments exemplified in FIGS. 6, 8 and 12, respectively.

Figure 1:
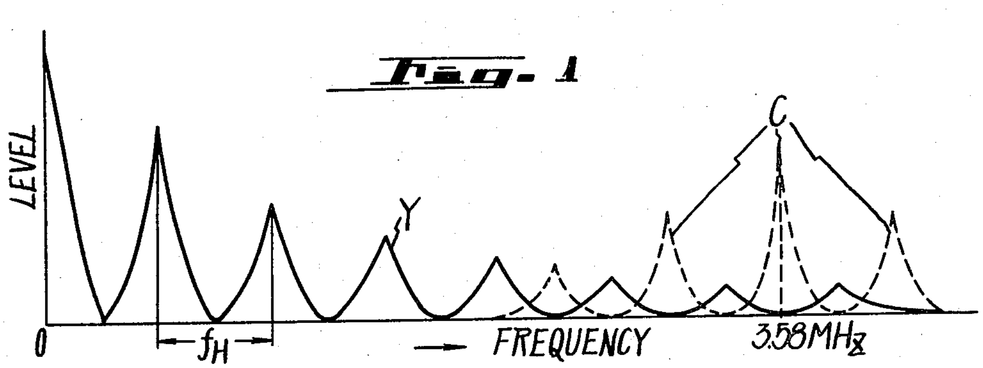
FIG. 1 is a graph showing one example of a frequency spectrum of a transmitted color television signal which is suitable for use with a circuit of this invention.

For facilitating understanding of this invention, a description will be given first of the spectrum distribution of a typical color television signal transmitted with the frequency interleaving method, as shown on FIG. 1. Such spectrum distribution shows peaks of the luminance signal Y occurring at frequencies which are spaced from each other by the horizontal scanning frequency $f_H$, while the chrominance signal C exists between high-frequency components of the luminance signal centering about a color subcarrier frequency of 3.58 MHz.

Figure 2:
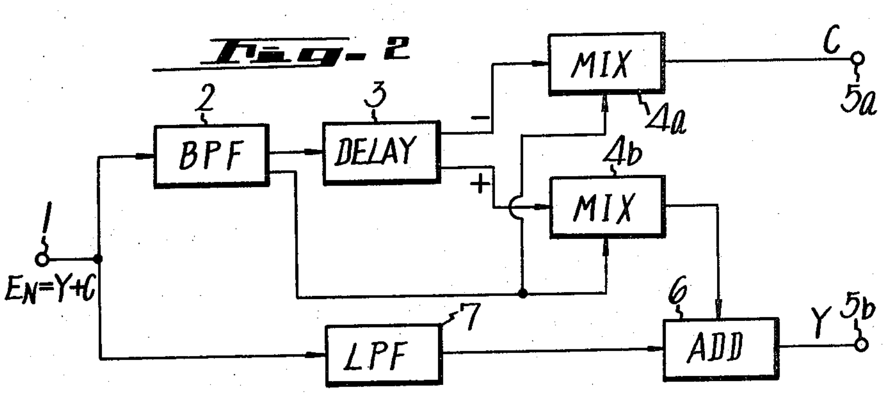
FIG. 2 is a block diagram of a conventional filter circuit.

As shown in in FIG. 2, a conventional filter circuit for the separation of the luminance signal and the chrominance signal has an input terminal 1 supplied with a composite signal $E_N$ consisting of the luminance signal Y and the chrominance signal C derived from a video detecting stage. One portion of such composite signal is applied to a band-pass filter 2 to derive therefrom the chrominance signal component and the high-frequency component of the luminance signal. The chrominance signal and the high-frequency component of the luminance signal are passed from filter 2 to a delay circuit 3 having a delay time of one horizontal scanning period to derive therefrom delayed outputs of opposite phase and such delayed outputs are applied to input terminals of mixer circuits 4*a* and 4*b*, respectively. A portion of the output of the band-pass filter 2, that is, the non-delayed chrominance signal component and the high-frequency component of the luminance signal, is applied to other input terminals of the mixer circuits 4*a* and 4*b*, respectively.

Figures 3A, 3B:
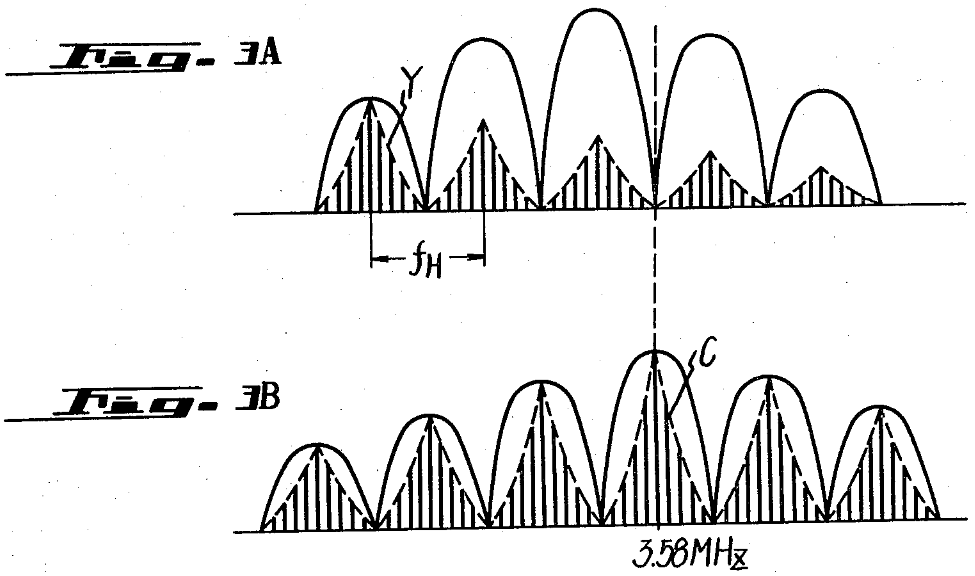
FIGS. 3A and 3B are frequency spectrum diagrams to which reference will be made in explaining the conventional filter circuit of FIG. 2.

Thus, the mixer circuit 4*a* which is supplied with the delayed signal from delay circuit 3 having its phase opposite to that of the non-delayed signal received from band-pass filter 2, acts as a subtraction circuit for subtracting such inputs, and the output of mixer circuit 4*a* presents a C-type characteristic, for example, as shown on FIG. 3B, so that only the chrominance signal C appears at the output terminal 5*a* connected with circuit 4*a*. On the other hand, the mixer circuit 4*b*, which is supplied with the delayed signal from delay circuit 3 having the same phase as the non-delayed signal received from band pass filter 2, acts as an adder circuit for adding such inputs. Thus, the output of the mixer circuit 4*b* presents a Y-type characteristic, for example, as shown on FIG. 3A, and only the high-frequency component of the luminance signal Y is obtained at the output of circuit 4*b*. The resulting high-frequency component of the luminance signal Y and the low-frequency component thereof derived from a low-pass filter 7 are supplied to an adder circuit 6 and are thereby added together, so that all of the components of the luminance signal Y will be obtained at the output terminal 5*b* connected to adder circuit 6.

The known arrangement described above with reference to FIG. 2 requires the use of very complex circuits to provide the components represented in block form on the drawing.

Figure 4:
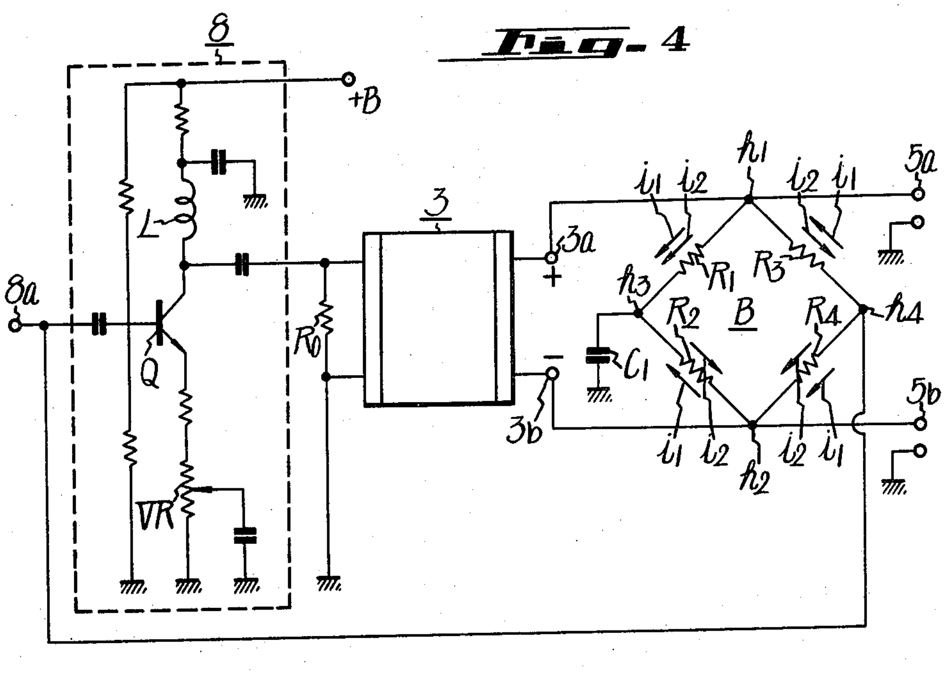
FIG. 4 is a wiring diagram illustrating one embodiment of the filter circuit according to this invention.

Referring now to FIG. 4, it will be seen that the desired separation of the luminance and chrominance signal components from the composite signal is achieved in accordance with this invention by a relatively simple circuit that includes a delay circuit having a delay time of one horizontal scanning period. Such delay circuit may comprise an ultrasonic delay line which consists of an ultrasonic medium, such as glass, and ultrasonic transducers provided at the input and output ends thereof. In order to provide delayed signals of opposite polarities at the terminals 3*a* and 3*b*, the output transducer of the delay line may be connected to the primary winding of a transformer which has the ends of its secondary winding connected to terminals 3*a* and 3*b* and a center tap extending from the secondary winding to ground. Since the signal level may be reduced by loss in such delay line, an an amplifier 8 including a transistor Q is provided at a stage prior to the delay circuit 3 to compensate for the loss in the delay circuit.

The input impedance of the ultrasonic delay circuit 3 is capacitive and a coil L is connected as an inductance load to the collector of the transistor Q for establishing equilibrium with respect to the capacitive input impedance of the ultrasonic delay circuit 3. A potentiometer VR is connected to the emitter circuit of the transistor Q to permit adjustment of the gain or amplification degree of the transistor Q and a resistor $R_O$ is connected in parallel with the input terminal of delay circuit 3 for prevention of reflection and for compensation of the frequency characteristic of delay circuit 3. Further, the delay circuit 3 is made to have a band-pass filter characteristic having a band width of substantially $\pm$ 1 MHz centering about a carrier frequency $f_c$ (for example, 3.58 MHz) of the chrominance signal C.

With such an arrangement, a composite signal including the luminance signal Y and the chrominance signal C is supplied to the input terminal 8*a* of amplifier 8 from a suitable source (not shown) which, of course, has an internal impedance, and the amplified output of the latter is applied to delay circuit 3 to provide delayed outputs of opposite polarities at the output terminals 3*a* and 3*b*.

In accordance with this invention, the outputs at terminals 3*a* and 3*b* of delay circuit 3 are applied to one pair of opposing connection points $h_1$ and $h_2$, respectively of a bridge circuit B consisting of four impedance elements, shown in the form of resistors $R_1$, $R_2$, $R_3$ and $R_4$, of substantially equal impedance values, and the input signal that is, the non-delayed composite video signal supplied to the input terminal 8*a* is applied to one of the other pair of opposing connection points $h_3$ and $h_4$ of the bridge circuit B to cause the latter to effect the addition and subtraction of the input and output signals of the delay circuit 3, and thereby to derive filtered outputs of opposite comb characteristics (Y- and C-typed) between the output terminal 5*a* and ground, and between the output terminal 5*b* and ground, respectively.

For this purpose, the output terminals 3*a* and 3*b* of the delay circuit 3 which, of course, has internal impedance connected with each of the terminals 3*a* and 3*b*, and the output terminals 5*a* and 5*b* are respectively connected to the opposing connection points $h_1$ and $h_2$ of bridge circuit B, and the connection point $h_3$ is grounded through a capacitor $C_1$ having a sufficiently great capacitance for low frequencies while the remaining connection point $h_4$ is connected to the input terminal 8*a*. The capacitor $C_1$ is provided for transmitting the DC component included in the input video signal to the output terminals 5*a* and 5*b*.

The potentiometer VR is adjusted so that the non-delayed signal supplied between connection point $h_4$ of the bridge circuit and ground and the delayed output will be at substantially the same level with respect to the same frequency component. By reason of the luminance signal component of the non-delayed signal supplied to the connection point $h_4$, electric currents $i_1$ flow in the resistors $R_1$ to $R_4$ of the bridge circuit in the directions shown on FIG. 4 to provide luminance signals between the output terminals 5*a* and 5*b* and ground which are attenuated down to one half of the input signal level, for example, attenuated-6 dB, by the resistors $R_1$ and $R_3$, and the resistors $R_2$ and $R_4$, respectively.

Since the delayed luminance signal (high-frequency component only) derived at the output terminal 3*a* of the delay circuit 3 is of the same phase as the luminance signal component supplied to the terminal $h_4$, an electric current $i_2$ is produced by the delayed luminance signal and flows from the connecting point $h_1$ to the connecting point $h_2$ simultaneously with the flow of electric current $i_1$. As a result of this, the currents $i_1$ and $i_2$ are added together in the resistor $R_1$ and subtracted in the resistor $R_2$ and consequently the added output signal appears between the output terminal 5*a* and ground and the subtracted output signal appears between the output terminal 5*b* and ground. This relationship does not change in the following half cycle, that is, when the directions of electric currents $i_1$ and $i_2$ are opposite to those shown on FIG. 4.

Figure 5:
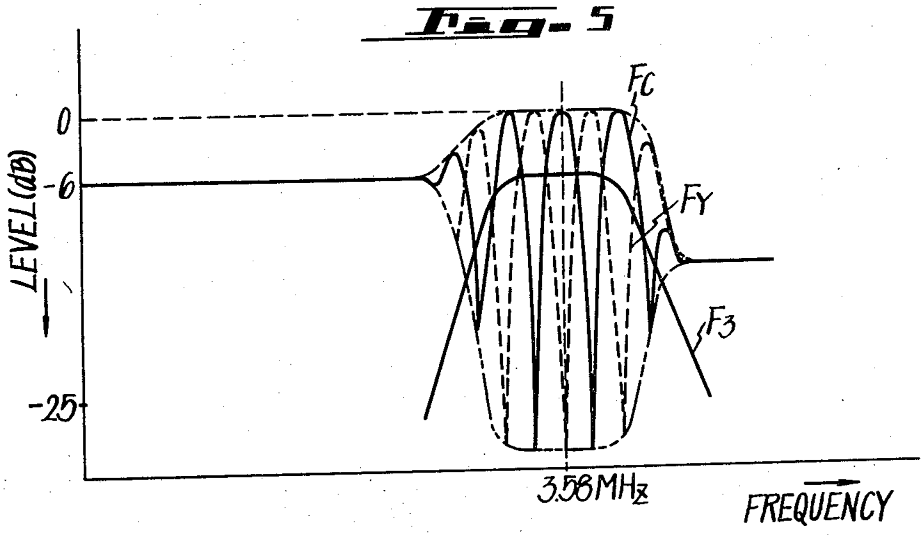
FIG. 5 is a graph for explaining the operation of the embodiment shown in FIG. 4.

Therefore, the luminance signal is obtained from the output terminal 5*a* but no luminance signal is derived from the output terminal 5*b*. On the other hand, the chrominance signal is frequency-interleaved with respect to the luminance signal and therefore its phase is inverted with respect to the luminance signal at every horizontal scanning. Thus, at the time of addition of the delayed and non-delayed luminance signals, the delayed and non-delayed chrominance signals are opposite in phase to each other and cancel each other, and, at the time of subtraction of the delayed and non-delayed luminance signals, the delayed and non-delayed chrominance signals are added together. Consequently, the chrominance signal is obtained across the resistor $R_2$ and not across the resistor $R_1$. Thus, no chrominance signal is obtained between the output terminal 5*a* and ground, that is, an output of the Y-type characteristic filter is derived therebetween, while only the chrominance signal is obtained between the output terminal 5*b* and ground, that is, an output of the C-type characteristic filter is derived therebetween, as shown on FIG. 5.

Beyond the range of the band-pass characteristic $F_3$ of the delay circuit 3, the low-frequency component of the luminance signal is derived from the output terminals 5*a* and 5*b* at a level which is attenuated by −6 dB with respect to the input level, and within the range of the band-pass characteristic $F_3$, the Y- and C-type characteristics $F_Y$ and $F_C$ are obtained. The peaks of the Y-type and C-type characteristics are at the same level as the input signal because the delayed and non-delayed signals are added to each other and each have one-half the level of the input signal.

In another embodiment of this invention illustrated in FIG. 6, a trap T of a series resonance type comprising a capacitor $C_t$, a resistor $R_t$ and a coil $L_t$ is connected between the connection point $h_3$ of the bridge circuit B and ground. The resonance frequency of the trap T is selected to be substantially the same as the center frequency of the pass band of delay circuit 3, and the impedance of the trap T is selected so as to be considerably greater than that of the bridge circuit B in the frequency band other than the resonance frequency. Thus, the affect of the impedance of the bridge circuit B is eliminated, thereby ensuring that the low- and intermediate-frequency components of the luminance signal Y are not attenuated −6dB by the bridge circuit B.

The characteristic $F_T$ of the trap T is selected, as shown on FIG. 7, so that the quality factor of the trap T is reduced by the resistor $R_t$ to decrease the impedance of the trap circuit T throughout its band characteristic $F_T$. Thus, the levels at the peak values of the Y- and C-type characteristics $F_Y$ and $F_C$ can be reduced substantially to agree with the low- and intermediate-frequency components of the luminance signal and provide a substantially flat characteristic.

FIG. 8 illustrates still another embodiment of this invention, in which at least an impedance element Z is connected between ground and the connection point $h_3$ of the bridge B opposite to the connection point $h_4$ supplied with the non-delayed signal, so that the impedance characteristic between the connection point $h_4$ and ground, represented by the curve *a* on FIG. 10, may be opposite to the frequency characteristic *b* of the delay circuit 3. This impedance element serves as a substitute for the capacitor $C_1$ connected between the connection point $h_3$ and ground in FIG. 4 and its impedance is made to be zero or extremely small with respect to the signals to be added and subtracted and infinite or extremely great with respect to the low-frequency component of the luminance signal.

In the illustrated embodiment, the element Z comprises series resonance circuits made up of capacitors and coils $C_1$ and $L_1$, $C_2$ and $L_2$, and $C_3$ and $L_3$, respectively, and which are connected in parallel with one another. The resonance frequency of the series resonance circuit consisting of capacitor $C_1$ and coil $L_1$ is selected to be at a frequency $f_1$ in the pass band of the delay circuit 3 (FIG. 10), and the resonance frequencies of the resonance circuits respectively made up of capacitor $C_2$ and coil $L_2$ and of capacitor $C_3$ and coil $L_3$ are respectively selected to be at $f_2$ and $f_3$, whereby the impedance value of the impedance element Z can be reduced to zero or made to be extremely small in the frequency band of the delay circuit 3. Therefore, flow is permitted of the electric current corresponding to the high-frequency component of the non-delayed signal to the bridge circuit B.

Since the impedance of the impedance element Z is infinite or extremely large with respect to components outside the band of circuit 3, that is with respect to the low-frequency component of the luminance signal, no electric current flows in the bridge circuit B for the low-frequency component of the luminance signal and the low-frequency component of the luminance signal is derived at the output terminals 5*a* and 5*b* at its input level, that is, without being attenuated by the resistors of bridge circuit B. A resistor $R_o$ is shown connected in series with the capacitor and coil of each resonance circuit forming the impedance element Z for lowering the quality factor of each resonance circuit.

FIG. 9 shows another embodiment of the present invention, in which the impedance element Z is connected between the connection point $h_3$ of the bridge circuit B and ground, as in the embodiment of FIG. 8, and an inductance element L is connected between the connection points $h_3$ and $h_4$. With such an arrangement, the cutoff frequency of the impedance element Z can be raised and its attenuation characteristic can be made sharp, thereby to permit the impedance characteristic to be substantially the opposite of the characteristic of delay circuit 3.

The impedance element Z may be variously modified, for example, as shown on FIG. 11, in which a series circuit made up of a capacitor $C_2$, a coil $L_2$ and a resistor $R_o$ constitutes a first resonance circuit and other resonance circuits respectively consisting of capacitor $C_1$ and coil $L_1$ and of capacitor $C_3$ and coil $L_3$ are connected in parallel with the resistor $R_o$. In this case, the single resistor $R_o$ is effective for damping the quality factor od all of the resonance circuits, and this decreases the number of the parts.

As will be seen from the foregoing, circuits according to this invention provide the Y- and C-type characteristic outputs and the low-frequency component of the luminance signal at substantially the same level and therefore do not require a level adjustment circuit having a frequency characteristic in the luminance signal system, for example, as at 6 and 7 on FIG. 2, so that the overall circuit construction is simplified.

FIG. 12 illustrates still another embodiment of this invention, in which the connection point $h_3$ of the bridge circuit B opposing the connection point $h_4$ supplied with the input signal to the amplifier 8 is connected to the emitter of a transistor $Q_1$. The transistor $Q_1$ is of emitter-follower construction and a signal derived from the input terminal 8*a* of amplifier 8 is supplied to the base of transistor $Q_1$ through a low-pass filter 9. The characteristic of low-pass filter 9, indicated by the curve $F_9$ on FIG. 13, is selected so that its output is attenuated in the band corresponding to the pass band characteristic $F_3$ of the delay circuit 3. Thus, luminance signals of the same phase and level are supplied to connection points $h_3$ and $h_4$ of bridge circuit B in the low- and intermediate-frequency ranges. Accordingly, the impedance between connection point $h_3$ and ground can be regarded as substantially infinite and the low- and intermediate-frequency components of the luminance signal are supplied to the output terminals 5*a* and 5*b* without being attenuated. On the other hand, in the band in which the output of low-pass filter 9 is attenuated, the level of the signal supplied to connection point $h_3$ is remarkably lowered and the delayed output of delay circuit 3 and the signal from the input terminal 8*a* are added and subtracted to provide the Y- and C-type characteristics, respectively.

As will be apparent from the foregoing, the present invention achieves the addition and subtraction of the delayed output and the non-delayed signal merely by supplying them to the bridge circuit B, which is connected to provide the Y- and C-type characteristic outputs at the output terminals 5*a* and 5*b* of the bridge circuit. Therefore, the luminance signal and the chrominance signal can be positively separated from each other without the possibility of introducing phase distortion.

In the described embodiments, the low- and intermediate-frequency components of the luminance signal are derived at the output terminal 5*b* together with the C-type characteristic output. However, if desired, a band-pass filter (not shown) may be interposed between connection point $h_2$ and the output terminal 5*b* to derive therefrom only the chrominance signal component.

Although the filter circuits according to the present invention have been described as being employed for separating the luminance and chrominance signals of a color television signal, it will be apparent that the present invention is also applicable to the separation of components of other signal transmission systems having such components in frequency interleaved relation.

Further, although specific embodiments of the invention have been described herein with reference to the drawings, it is to be understood that the invention is not limited to those precise embodiments, and that various changes and modifications may be effected therein by one skilled in the art without departing from the scope or spirit of the invention.

What is claimed is:

1. A comb filter circuit for separating luminance and chrominance signal components from a composite color television signal which is transmitted with a frequency interleaving relation between said luminance and chrominance signal components, comprising delay means for delaying said composite signal by substantially one horizontal scanning period and for producing first and second delayed signals of opposite polarities to each other, bridge circuit means including four arms of substantially equal impedance and first and second pairs of opposed connecting points between said arms, means for supplying said first and second delayed signals to the opposed connecting points, respectively, of said first pair thereof, means for supplying said composite signal to at least one of said connecting points of said second pair thereof, and output terminals connected with one of said pairs of opposite connecting points so that the luminance and chrominance signal components respectively appear at said output terminals.

2. A comb filter circuit according to claim 1, in which said output terminals are respectively connected with said first pair of opposed connecting points.

3. A comb filter circuit according to claim 1, further comprising a low-pass filter having a frequency band lower than that of said delayed signals and through which said composite signal is also supplied to the other of said connecting points of said second pair.

4. A comb filter circuit according to claim 1, further comprising impedance means through which the other of said connecting points of said second pair is connected to ground.

5. A comb filter circuit according to claim 4, in which said impedance means consists of a capacitor.

6. A comb filter circuit according to claim 4, in which said impedance means consists of a resonance circuit having a low impedance at the frequency band of said delayed signals.

7. A comb filter circuit according to claim 1, further comprising amplifier means for amplifying said composite signal prior to the passage thereof through said delay means.

8. A comb filter circuit according to claim 7, in which said amplifier means includes means for controlling the level of the composite signal supplied by said amplifier means to said delay means so that said delayed signals and said composite signal are supplied to said bridge circuit means at substantially the same level.

* * * * *